United States Patent [19]

Evans

[11] 4,144,936
[45] Mar. 20, 1979

[54] DOWN HOLE MILLING OR GRINDING SYSTEM

[75] Inventor: Robert F. Evans, La Habra, Calif.

[73] Assignee: Smith International, Inc., Newport Beach, Calif.

[21] Appl. No.: 807,086

[22] Filed: Jun. 16, 1977

[51] Int. Cl.² ............................................. E21B 29/00
[52] U.S. Cl. ................................. 166/298; 166/55.7; 166/65 R; 204/129.46
[58] Field of Search ............. 166/55.6, 65 R, 298, 166/55, 55.1, 55.7, 55.8, 248; 204/129.1, 129.46, 224 M, 212, 129.5; 175/15, 16, 64

[56] References Cited

U.S. PATENT DOCUMENTS

| | | | |
|---|---|---|---|
| 1,358,818 | 11/1920 | Bering | 166/55.7 |
| 2,660,240 | 11/1953 | Ringler | 166/55.7 |
| 3,271,288 | 9/1966 | Crawford et al. | 204/212 |
| 3,696,014 | 10/1972 | Goodard et al. | 204/129.46 |
| 3,769,194 | 10/1973 | Haggerty | 204/212 |

FOREIGN PATENT DOCUMENTS

| | | | |
|---|---|---|---|
| 428770 | 4/1967 | Japan | 204/129.5 |
| 456891 | 2/1975 | U.S.S.R. | 166/55 |

Primary Examiner—Ernest R. Purser
Attorney, Agent, or Firm—Knobbe, Martens, Olson, Hubbard & Bear

[57] ABSTRACT

Apparatus is disclosed for milling metal submerged in salt water or within a hole, such as cutting off the upper ends of pipes and casings in a well-drilling operation below the sea floor. A hydraulic motor is suspended in the hole and driven by sea water to rotate an electrical generator and to rotate a cutting tool. The tool includes radially movable, electrically conductive elements which form the cathodes of an electrochemical machining operation for removing metal. The tool elements include abrasive material so that they can mechanically cut through cement.

19 Claims, 4 Drawing Figures

DOWN HOLE MILLING OR GRINDING SYSTEM

This invention relates to down hole milling or cutting in earth boring operations and is particularly useful in drilling operations beneath the ocean floor. In oil well drilling and other earth boring operations, it is frequently necessary to cut pipes or other metal items within the hole. As one recent example, environmental requirements dictate that the portions of a well head casing extending above the ocean floor should be removed if the well is abandoned. Holes are frequently drilled for test purposes with the expectations that they will be abandoned. Consequently, it is often necessary to perform such removal operations.

To leave the ocean floor most like its original condition, the upper ends of the pipes and casings must be severed some distance below the ocean floor so that the upper portions can be removed. Currently, equipment exists for such down hole cutting operations wherein radially expandable cutters are employed for mechanically cutting through steel casings. Unfortunately, such methods are relatively slow, costly, and unreliable. Explosive methods have been used but are dangerous and harmful to the environment. Accordingly, a need exists for improvements in down hole metal cutting operations.

In accordance with the present invention, a system is provided wherein electrochemical machining or grinding is employed. Electrochemical machining methods have been known for some years but it is only recently that such methods are being more widely used. Possibly one of the reasons that such methods have not been adopted more often is that an electrolyte is necessary in the process and all good electrolytes are considerably more corrosive than most fluids used around machine tools such as hydraulic or lubricating and cutting fluids. This corrosiveness entails more expensive materials of construction for the machine, tools, fixtures and peripheral equipment such as pumps, filters, etc. This corrosive characteristic also shortens the life of many parts around the machine. However, this disadvantage already exists in connection with off-shore drilling operations in that salt water is corrosive and the equipment for using salt water as the drilling fluid is already available in such operation.

Thus, in accordance with the present invention, an electrically conductive tool having the necessary characteristics of a cathode in an electrochemical machining operation is suspended in the drill hole in the location where machining is required. An electric current is applied through the tool and the adjacent pipe or other work piece which is to be cut. The sea water or conductive drilling mud adjacent the tool and the work piece serves as an electrolyte such that the metal is electrochemically removed from the work piece. Circulating the salt water or mud past the cutting area continuously supplies the necessary electrolyte and cools the operation and carries away the dissolved metal and freed metal particles. The most convenient means for circulating the electrolyte is the existing equipment which is already available at the drill site for circulating the drilling fluid.

Means are provided for moving the tool in a desired pattern to obtain the desired cut. For example, if a pipe is to be severed, the tool may be rotated adjacent the inner wall of the pipe and simultaneously moved radially outwardly as the cutting progresses. The electricity and the mechanical power for moving the tools may be provided in various ways, but in a preferred approach, a hydraulic motor is employed which may be positioned in the hole closely above the location where the cutting is to occur. This motor may be powered by the salt water being circulated through the hole. Apparatus of this type is already available and used for certain drilling operations where it is undesirable to ratate an entire drill string. The output of the hydraulic motor is employed to drive a sealed electric generator which provides electrical power for the machining operation, and is also employed to move the cutting tool. Thus, the entire cutting apparatus may be assembled as an integral unit and lowered into the hole to perform the cutting operation at the desired location.

Electrochemical grinding wheels are currently employed which are made of a nonconductive abrasive material and also contain a sufficient quantity of the electrically conductive metal required for the electrochemical machining operation. With such a tool, mechanical grinding can be simultaneously accomplished with the electrochemical machining. The abrasive material sufficiently separates the electrically conductive portions from the work piece so that the electrolyte is needed to complete the electrical circuit; the abrasive material helps sweep away the metal as it is electrochemically separated or dissolved. This type of cutting tool is a down-hole milling operation in particularly advantageous in that it can mechanically cut cement or concrete which is often positioned between steel pipes or casings.

In a preferred form of the invention, the abrasive tool is in the form of a plurality of elements mounted on insulated, electrically conductive metal, spring fingers that are normally urged into a radially inward position but are movable outwardly by centrifugal force to engage the inner walls of the surrounding tubular structure as the tool is rotated. Beryllium copper is suitable for this purpose. To provide electrical contact with metal piping that may be situated radially outwardly from a cement section, contact members are mounted on electrically conductive spring arms that are positioned between the arms carrying the tool elements. With this arrangement, the contact with such a metal pipe may be made through the kerf formed by the cutting tool elements.

For a more thorough understanding of the invention, refer now to the following detailed description and drawings in which.

Figure 1:
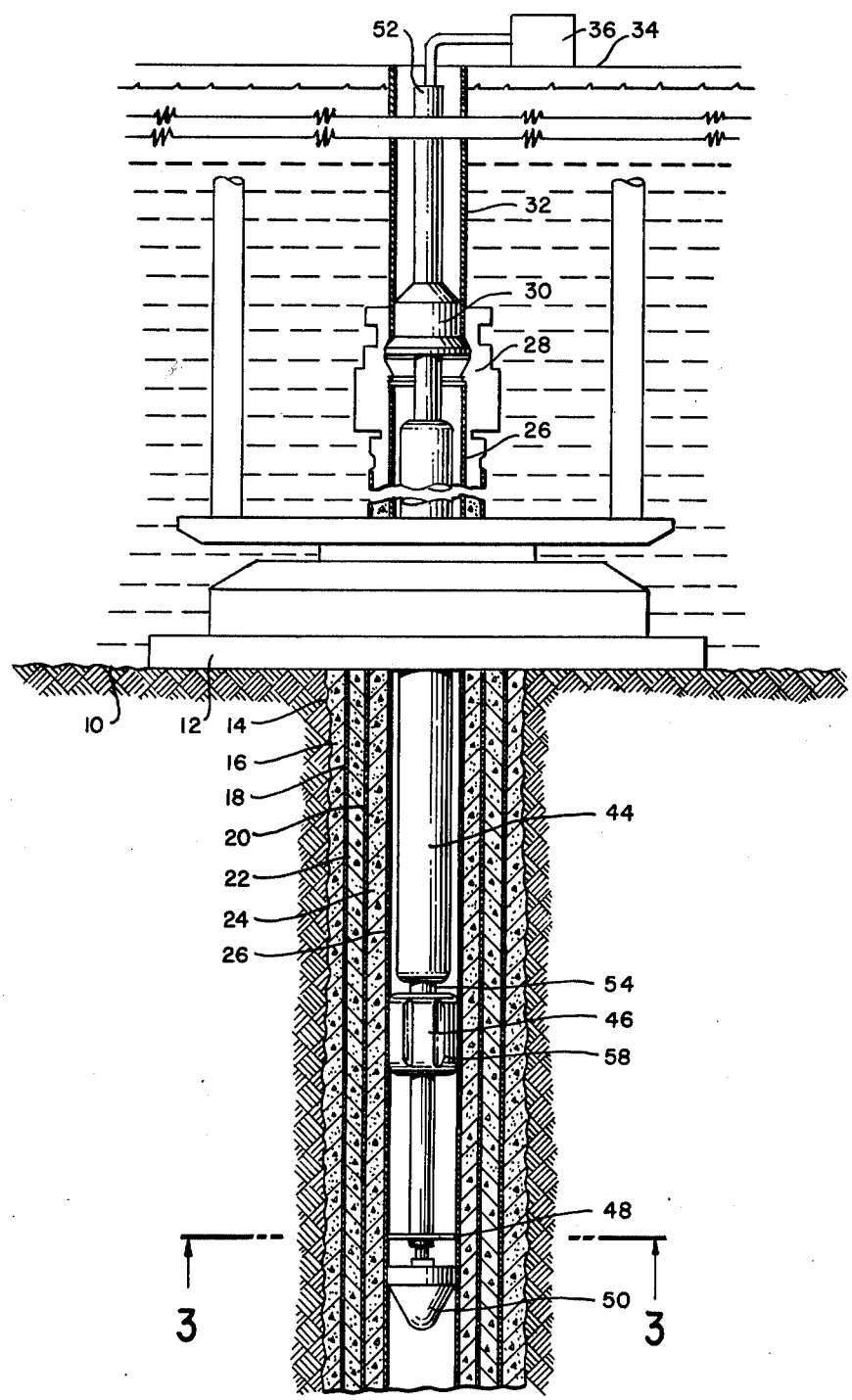
FIG. 1 is a cross-sectional, schematic view of an under water drilled hole showing the cutting apparatus of the invention in position within the hole.

Referring now to FIG. 1, the underwater drilling site shown on the ocean floor 10 includes a guide base structure 12 supported on the ocean floor surrounding a hole 14 which has been drilled in the earth. The hole has been lined with a layer of cement 16 surrounding a metal pipe or casing 18. Spaced inwardly from the casing 18 is another casing 20 and a layer of cement 22 is positioned between the casings 18 and 20. Positioned within this casing is another tubular layer of cement 24 and an inner pipe 26. The outer casings and cement layers end at the ocean floor or within the support 12. The inner pipe 26 extends upwardly through the support 12 and into a support collar 28. A marine support swivel 30 is mounted in the collar and connects with the upper end of the pipe 26. A further pipe 32 extends upwardly from the swivel 30 through the water to a support platform or a drilling ship, schematically indicated by the line 34. The marine support swivel is known structure which accommodates lateral movement of the pipe 32 within the water. Mounted on the support 34 is suitable means 36 for circulating drilling fluid through the inner pipes.

As explained above, it is often desirable to drill a test hole with the intention that it will be abandoned. When this occurs, the hole is plugged and it is necessary to cut off the upper ends of the pipe beneath the sea floor and to remove the support equipment so that the sea floor is left in the approximate condition that it originally was. The apparatus positioned within the inner pipes will accomplish this cutting function. This includes an elongated hydraulic motor 44, an electric generator 46, a cutting tool 48 and a centering probe 50. A suitable form of the hydraulic motor 44 is that currently sold by the assignee of this application under the trademark DYNA-DRILL. This motor can be suspended in a drill hole as shown and be powered by fluid under pressure which is provided from a source exterior of the well to produce a rotary output to drive a drill bit or other component. Usually, such a motor is powered by the drilling fluid which is already being circulated through the hole to carry the drill cuttings. As shown in the drawings, a hollow support string 52 connects the upper end of the hydraulic motor 44 to the means 36 for circulating fluid through the wall.

Figure 2:
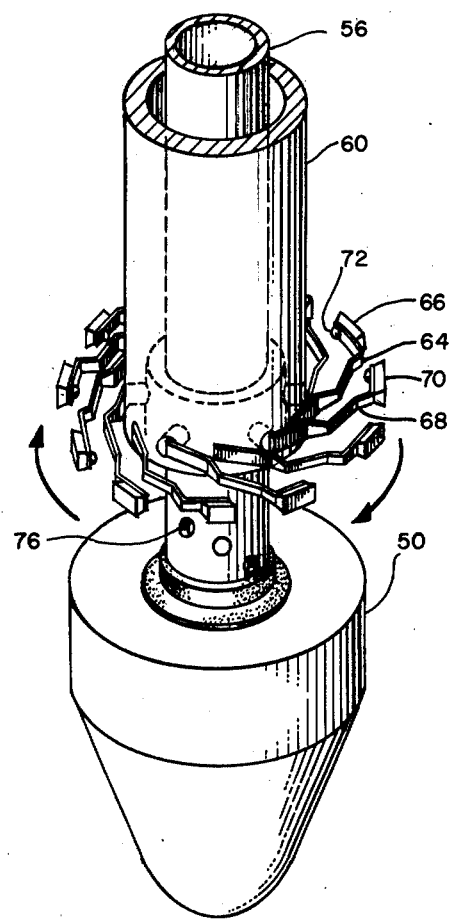
FIG. 2 is an enlarged perspective view of the lower end of the apparatus in FIG. 1 illustrating one form of the cutting tool and electrical contact members.

The electrical generator 46 is supported beneath the motor 44 by a tube 54 or other suitable means and the motor drive shaft 56 shown in FIG. 2 is connected to drive the generator 46. The generator is suitably sealed so that it can satisfactorily operate while submerged within salt water. While the exterior of the generator is shown fitting closely within the pipe 26, it may be spaced from the pipe, or provided with suitable passages schematically shown at 58 in FIG. 1 in the exterior of the generator to permit fluid to circulate through the pipe 26.

Figure 3:
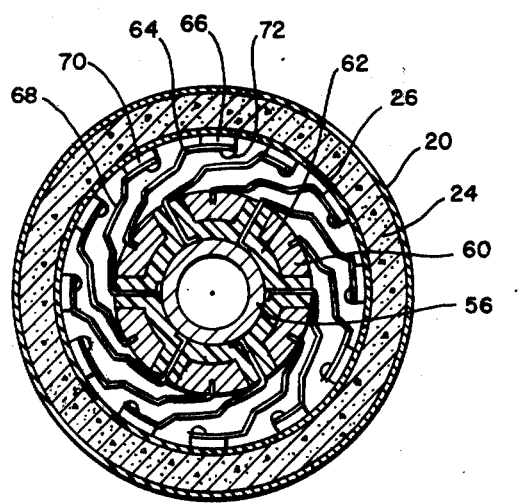
FIG. 3 is a cross-sectional view on line 3—3 of FIG. 1 illustrating the cutting tool in operation within a pipe.
Figure 4:
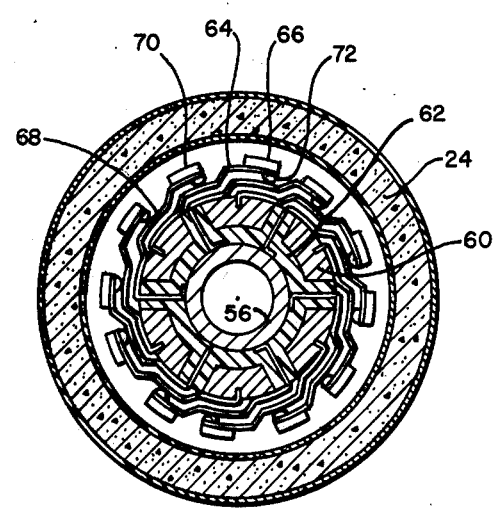
FIG. 4 is a cross-sectional view similar to that of FIG. 3 but showing the cutting tool at rest.

The electrical output from the generator 58 plus the rotational output of the motor 44 is to be transmitted to the tool 48 so that it can be rotated while electrical power is applied. This may be accomplished by a number of arrangements; however, in a preferred approach, the electrical power and the mechanical rotational drive are combined. Such an arrangement is schematically illustrated in FIGS. 2 through 4. The motor output shaft 56 extends completely through the generator and as can be seen from the drawings, is in tubular form. Surrounding the tubular shaft 56 is a tube 60 which is connected within the generator to be driven with the shaft 56. The lower end of the outer tube 60 is positioned by an insulating spacer 62 extending between the shaft 56 and the tube 60. The lower end of the tube 60 is formed with a plurality of holes which extend radially through the tube, and the insulating material of the collar 62 extends into these holes.

The tool 48 which is schematically shown in FIG. 1 and in greater detail in FIGS. 2–4 comprises a plurality of electrically conductive spring-like fingers 64 having their inner ends connected to the tube 60 and their outer ends carrying cutting pads or elements 66. Six of such fingers are shown in the drawings, but of course, the exact number is a matter of design.

Positioned on each side of each finger 64 is a similar flexible finger 68 having its inner end extending through the insulated hole in the outer tube 60 and engaging the exterior of the inner shaft 56. Positioned on the outer end of each of the flexible fingers 68 is a contact pad or element 70 made of electrically conductive material. The fingers 64 and 68 are made of electrically conductive spring material, such as beryllium copper. The fingers have a coating of electrical insulation (not shown) except on the portions connecting to other components. A button 72 of insulation material is positioned on the outer end but on the inner side of each of the fingers 64 and 68. The fingers are self-biased into the position shown in FIG. 4 and the insulating buttons 72 provides further insurance to electrically insulate the adjacent fingers.

The probe 50 is supported on the lower end of the shaft 56 by a suitable bearing (not shown) to keep the tool 48 properly centered in the pipe. The bearing permits the probe to remain stationary frictionally engaging the pipe while the shaft 56 rotates. A plurality of holes 76 are formed in the side wall of the shaft 56 above the probe 50 to permit liquid communication between the interior and exterior of the shaft.

OPERATION

As indicated above, the described apparatus is to cut through the pipes and casings by using electrochemical machining or grinding. There are really three sub-systems involved in machining of this type, namely, mechanical, electrical and chemical. In the mechanical system, the cutting elements 66 are to be moved adjacent the work piece which represented by the pipe 26. Also, the cutting elements should continue to be positioned adjacent the work piece as the cutting progresses. Thus, in operation, the shafts 56 and 60 are rotated by the motor 44, which is powered by seawater pumped downwardly through the hollow drill string. This rotation causes the spring fingers 64 to move outwardly from the rest position of FIG. 4 under centrifugal force to the position of FIG. 3, so that the cutting elements 66 engage the inner surface of the pipe 26. Also, this action causes the fingers 68 to flex outwardly so that the contact elements 70 engage the inner surface of the pipe.

In the electrical system, it is necessary to apply a direct current voltage to the cutting elements 66 and to the work piece or pipe 26. Thus, the outer tube 60, the fingers 64 and the cutting elements 66 are electrically connected to the negative output side of the generator 58 by suitable means (not shown) and the positive side of the generator is connected to the shaft 56, the finger 68 and the work piece or pipe 26. As explained above, the cutting elements 66 are actually formed of an abrasive material with conductive particles therein. There are enough conductive particles within the material so that a current can be transmitted through the cutting elements but the electrical resistance between the cutting element 66 and the pipe 26 is high because of the nonconductive abrasive material so that there is little or no current flow between the pipe and the cutting elements unless there is some other conductive medium to improve the conductive path. In other words, it is comparable to there being a slight gap between the cutting element 66 and the pipe with a direct current voltage applied across the gap. On the other hand, the electrical connection between the contact elements 70 and the pipe is very good in that the elements 70 are made of conductive material.

The electrical circuit is completed by the salt water which is circulated past the cutting elements as part of the chemical system. That is, the salt water is an electrolyte such that the free ions within the electrolyte can conduct current between the pipe 26 and the cutting elements 66. This completion of the circuit provides an electrochemical machining action which dissolves metal from the pipe.

Besides serving as an ion-transport medium, the electrolyte removes gas bubbles, heat, and reaction products from the tool area. Thus, it is necessary to circulate the electrolyte past the cutting elements. This is accomplished by the circulation system referred to above wherein the pump 36 on the drilling ship or support platform 34 circulates sea water downwardly through hollow string 52 to the hydraulic motor 44, where it is ducted internally through the motor, the generator and the inner shaft 56 and out the holes 76 in the lower end of the shaft. The liquid is then forced upwardly past the cutting elements 66 through the grooves 58 in the generator 46 and upwardly through the annular space surrounding the motor 44 and out the upper end of the pipe 26, thus, completing the circulation cycle.

The rotating elements 66 produce an electrochemical action around the interior of the pipe 26 and the abrasiveness of the material in the cutting elements 66 help brush away the reaction particles which are formed during the electrochemical action. This metal cutting method has the advantage of cutting very hard materials with ease while mechanical methods fail when highly heat treated steels or tungsten carbide items are encountered. The circulating sea water washes away the particles. As a cut is formed, the fingers 64 move radially outwardly to continue the cutting action as the kerf is formed and the fingers 68 also move radially outwardly so that the elements 70 move into the kerf and thus maintained adequate electrical contact.

When the cut through the metal of the pipe 26 has been completed, the cutting elements 66 engage the cement 24. This, of course, interrupts the electrochemical machining; but since the elements 66 are abrasive, they mechanically grind through the cement until the next metal layer is reached. At this point, further electrochemical grinding occurs in that both the cutting elements 66 and the contact elements 70 are engaging the next metal layer 20 having moved outwardly within the kerf which has been formed. In this manner, the entire concentric group of pipes and casings and cement may be quickly and efficiently cut. Once the cut is completed, the upper ends of the pipes and casings may be mechanically pulled out of the hole.

While the preferred method has been described, it should be understood that certain variations may be employed if desired. For example, as mentioned above, the motor 44 may be driven by pressurized liquid other than the drilling fluid, in this case sea water. Similarly, an electrolyte other than salt water may be employed. In land operations where a salt water drilling fluid would not normally be employed, it may be desirable to have an electrolyte circulation system that is completely separate from the normal drilling fluid that might be employed.

Also, from the electrical and mechanical aspects, the rotary power required for rotating the tool 48 may be provided from above the hole rather than through a hydraulic motor located in the hole. The mechanical power can be provided by a sealed electric motor receiving its electric current from cables extending from above the hole. Likewise, the electric current for the electrochemical machining may be supplied through insulated conductors from the surface.

It should also be understood that a variety of cutting tools may be employed, adapted for the particular cutting or grinding operation. For example, the cutting electrodes could be mounted on telescoping arms or a sissors type expandable cutting wheel that would move outwardly by centrifugal force, spring force, or hydraulic force. Also, when cutting only through metal, the probe 50 can be electrically connected to the power source so that it provides the electrical contact for the pipe or other metal workpiece being cut so that there would be no need to have moving elements such as the fingers 68 to move outwardly within the kerf.

The method is useful for many other down hole metal cutting applications such as fishing jobs where large metallic objects are lost in a well while drilling, cutting casing in a pattern useful for side tracking a cased well bore in order to drill in a new direction. There are many ocean salvage operations where the method is useful such as cutting through the hull of a sunken ship to remove known valuable material.

What is claimed is:

1. A method of cutting an electrically conductive metal pipe located beneath the earth surface comprising:
   suspending an electrically conductive tool within said metal pipe;
   applying an electric power source to said tool and said pipe;
   circulating an electrolyte adjacent the interior of said pipe in the area to be cut to conduct current between said tool and said pipe to perform electrochemical removal of metal from said pipe; and
   rotating said tool within said pipe while simultaneously moving said tool radially outwardly as the electrochemical removal of metal continues to thereby cut through said pipe.

2. The method of claim 1 wherein the electric current is applied to said pipe by means of a probe which engages the inner wall of the pipe adjacent said tool.

3. A method of cutting an electrically conductive metal work piece located beneath the earth surface comprising:
   suspending an electrically conductive tool adjacent said metal work piece;
   applying an electric power source to said tool and said work piece;
   circulating an electrolyte adjacent said work piece to conduct current between said tool and said work piece to perform electrochemical removal of metal from said workpiece; and
   positioning a fluid-drive motor near the workpiece and driving said motor with fluid under pressure from a remote source and moving said tool with said motor in a manner to continue said removal and obtain the desired cutting.

4. The method of claim 3 wherein said fluid is said electrolyte.

5. The method of claim 3 wherein an electrical generator is positioned adjacent the workpiece and driven by said motor to provide an electrical output which is applied to said tool and said workpiece.

6. The method of claim 5 wherein said workpiece is a metal pipe, said tool is positioned within said pipe, and said tool is rotated by said motor while simultaneously being moved radially outwardly as the electrochemical removal of metal continues.

7. The method of claim 6 wherein said tool is rotated by said motor and said tool is made of an abrasive material with electrically conductive particles therein so that said tool can perform mechanical grinding as well as electro chemically removing metal from the workpiece.

8. A method of cutting the upper ends of a pipe positioned within a hole drilled in the earth beneath a body of salt water, comprising:
   positioning an electrically conductive tool in said pipe;
   rotating said tool within said pipe adjacent the inner wall of said pipe by means of a hydraulic motor suspended in said pipe;
   pumping salt water into said hole to drive said motor;
   positioning an electric generator in said hole and driving the generator with said motor;
   applying an electric output from said generator to said tool and said pipe; and
   circulating salt water around said tool and the adjacent inner wall of said pipe while the tool is being rotated and said electric output is being applied to the tool and the pipe, said salt water serving as an electrolyte to complete the electrical path between the tool and the pipe.

9. Apparatus for electrochemically cutting a metal pipe or other such workpiece remotely located beneath the earth's surface comprising:
   an electrically conductive tool and means for suspending the tool adjacent the metal to be cut;
   means for applying said electric current to said tool and said workpiece including a hydraulic motor suspended near said workpiece and an electrical generator suspended adjacent said motor and connected to be driven by said motor, said generator applying electric current to said tool and said workpiece;
   means for circulating an electrolyte between said tool and said workpiece to provide electrochemical machining of said workpiece and for driving said motor; and
   means driven by said motor for moving said tool to obtain the desired cutting.

10. The apparatus of claim 9 including means connecting said motor to said tool for rotating the tool.

11. Apparatus for electrochemically cutting a metal work piece in a somewhat inexcessible location comprising:
    an electrically conductive tool and tubular means for suspending the tool adjacent the metal to be cut;
    means for applying an electric current to said tool and means suspended adjacent to said tool and engaging said work piece for applying current to said work piece;
    a plurality of elements made of the proper material to serve as a cathode in an electrochemical machining operation, and an electrically conductive spring finger for each of said elements, with each element being mounted on the free outer end of a spring, and the inner end of said spring being connected to said means for supplying the electric current, said spring being constructed and mounted to normally urge its cutting element radially inward away from the inner wall of said pipe, but said spring being constructed such that upon rotation of the tool, centrifigual force will cause the spring to flex outwardly holding its element adjacent the inner wall of said pipe;
    means for circulating an electrolyte through said tubular means and between said tool and said work piece to provide electrochemical machining of said work piece; and
    means for moving said tool to obtain the desired cutting.

12. The apparatus of claim 11 wherein said elements are made of an abrasive material with electrically conductive particles therein such that the elements can actually continuously contact said pipe and said particles will conduct electric current in close proximity to the inner wall of the pipe but yet in electrical circuit between the elements and the pipe is incomplete without said electrolyte.

13. The apparatus of claim 12 including a plurality of contact elements mounted on radially extendable spring arms which apply an electric current to said pipe.

14. The apparatus of claim 13 wherein said spring arms are circumferentially positioned between the elements of the arms carrying said tool elements so that the contact elements ride within the kerf created by said tool elements so that the contact elements can continue to engage the same structure engaged by the tool elements.

15. The apparatus of claim 14 wherein said tool elements are sufficiently abrasive to be able to grind through concrete under high-speed rotation so that the tool may grind through concentric layers of pipe and concrete.

16. Apparatus for cutting through metal and concrete pipe and casing which line the walls of the hole formed in a drilling operation beneath a body of saltwater, said pipes and casings including metal piping which extends from above the surface of the body of water down into the hole in the earth beneath the water, and a plurality of concentric layers of concrete within metal casings concentrically surrounding the portion of the piping extending into the earth beneath the water, said apparatus comprising:
    an elongated hydraulic motor suspended in said pipe and having a downwardly extending rotatable output shaft;
    an electric generator positioned in said pipe below said motor, supported by said motor and driven by said output shaft;
    an electrically conductive tool positioned below said generator and rotated by said output shaft which extends through said generator, said tool including one or more metal elements made of material suitable to form cathodes in an electrochemical machining operation;
    means electrically connecting said tool elements to the output of said electrical generator;
    means connecting the output of said electrical generator to the inner wall of said pipe adjacent said tool elements; and
    means for pumping salt water through said hydraulic motor to drive the motor and means for circulating the saltwater in said pipe including circulating the water around said tool elements so that the salt water can serve as the electrolyte in an electrochemical machining operation for cutting into said pipe.

17. The apparatus of claim 16 wherein said tool elements are formed to an abrasive material suitable for grinding through concrete when rotated against the inner wall of a tubular section of concrete, and said tool elements further having electrically conductive particles within said abrasive material.

18. The apparatus of claim 17 including means for supporting said tool elements such that they are moved radially outwardly while being rotated and said means connecting the generator output to said inner wall includes contact elements arranged to move within the kerf formed by said tool elements so as to continuously apply an electric current to the pipe or casing being cut.

19. Apparatus for electrochemically cutting a metal pipe or other such work piece remotely located beneath the earth's surface comprising:
   an electrically conductive tool and means for suspending the tool adjacent the metal to be cut;
   means for applying an electric current to said tool and said work piece;
   a plurality of elements made of the proper material to serve as a cathode in an electrochemical machining operation, and an electrically conductive spring finger for each of said elements, with each element being mounted on the free outer end of a spring, and the inner end of said spring being connected to said means for supplying the electric current, said spring being constructed and mounted to normally urge its cutting element radially inward away from the inner wall of said pipe, but said spring being constructed such that upon rotation of the tool, centrifigual force will cause the spring to flex outwardly holding its element adjacent the inner wall of said pipe;
   means for circulating an electrolyte between said tool and said work piece to provide electrochemical machining of said work piece; and
   means for rotating the tool adjacent the work piece and simultaneously moving the tool radially outward as the cutting progresses.

* * * * *